US009825565B2

(12) United States Patent
Sullivan et al.

(10) Patent No.: US 9,825,565 B2
(45) Date of Patent: Nov. 21, 2017

(54) SYSTEM AND METHOD FOR STARTING A MOTOR

(71) Applicant: Regal Beloit America, Inc., Beloit, WI (US)

(72) Inventors: Gregory P. Sullivan, Fort Wayne, IN (US); Bryan J. Stout, Fort Wayne, IN (US); Brian L. Beifus, Fort Wayne, IN (US); Aldo Sebastian Bertoncini, New Haven, IN (US); Michael R. Koller, Columbia City, IN (US)

(73) Assignee: Regal Beloit America, Inc., Beloit, WI (US)

(*) Notice: Subject to any disclaimer, the term of this patent is extended or adjusted under 35 U.S.C. 154(b) by 0 days.

(21) Appl. No.: 15/404,287

(22) Filed: Jan. 12, 2017

(65) Prior Publication Data

US 2017/0126157 A1    May 4, 2017

Related U.S. Application Data

(63) Continuation of application No. 14/447,141, filed on Jul. 30, 2014, now Pat. No. 9,577,556.

(51) Int. Cl.
*H02K 29/06* (2006.01)
*H02P 6/20* (2016.01)
*H01P 1/16* (2006.01)

(52) U.S. Cl.
CPC . *H02P 6/20* (2013.01); *H01P 1/16* (2013.01)

(58) Field of Classification Search
CPC .................................... H02P 6/20; H02P 1/16
USPC ...................................................... 318/400.32
See application file for complete search history.

(56) References Cited

U.S. PATENT DOCUMENTS

| 1,871,455 | A | 8/1932 | Jordan |
| 3,679,924 | A | 7/1972 | Menzies |
| 4,843,295 | A | 6/1989 | Thompson et al. |
| 5,017,845 | A | 5/1991 | Carobolante et al. |
| 5,844,383 | A | 12/1998 | Denaci |
| 6,563,287 | B2 | 5/2003 | Shepeck et al. |
| 7,253,535 | B2 | 8/2007 | Duesterhoeft |
| 2014/0117894 | A1 | 5/2014 | Huang et al. |
| 2014/0132199 | A1 | 5/2014 | Zanelato et al. |

*Primary Examiner* — Erick Glass
(74) *Attorney, Agent, or Firm* — Armstrong Teasdale LLP

(57) ABSTRACT

A motor controller coupled to a motor is provided. The motor controller is configured to transmit a first instruction to the motor to perform a first start attempt utilizing at least one parameter in a first set of parameters, wherein the first set of parameters are not preconfigured for a specific application in which the motor is being installed. The motor controller is additionally configured to receive feedback associated with the first start attempt from the motor, and transmit, in response to the feedback, a second instruction to the motor to perform a second start attempt utilizing at least one parameter in a second set of parameters, wherein the second set of parameters differ from the first set of parameters.

20 Claims, 4 Drawing Sheets

SYSTEM AND METHOD FOR STARTING A MOTOR

CROSS REFERENCE TO RELATED APPLICATIONS

This application is a continuation of U.S. patent application Ser. No. 14/447,141, filed on Jul. 30, 2014, which is hereby incorporated by reference in its entirety.

BACKGROUND

The field of the disclosure relates generally to motor controllers, and more particularly, to systems and methods for starting a motor.

At least some known systems that include an electronically commutated motor (ECM) utilize a preconfigured set of parameters for controlling the amount of effort exerted by the motor to overcome environmental conditions, a load coupled to the motor, and/or other factors that may resist starting of the motor. The parameters generally pertain to a voltage, a current, and/or one or more time periods during which the current and voltage are applied to each of a plurality of windings in the motor. The values of the parameters are tuned to an expected application and environment for the motor. Applying insufficient effort prevents the motor from starting. Similarly, it is possible to apply too much effort, which also prevents the motor from starting. Accordingly, for such systems, a manufacturer or distributor that provides the motor to a customer may be required to spend time and money configuring the parameters in order for the motor to start properly at the customer's location.

BRIEF DESCRIPTION

In one aspect, a motor controller coupled to a motor is provided. The motor controller is configured to transmit a first instruction to the motor to perform a first start attempt utilizing at least one parameter in a first set of parameters, wherein the first set of parameters are not preconfigured for a specific application in which the motor is being installed. The motor controller is additionally configured to receive feedback associated with the first start attempt from the motor, and transmit, in response to the feedback, a second instruction to the motor to perform a second start attempt utilizing at least one parameter in a second set of parameters, wherein the second set of parameters differ from the first set of parameters.

In another aspect, a method for starting a motor is provided. The method includes transmitting, by a motor controller, a first instruction to the motor to perform a first start attempt utilizing at least one parameter in a first set of parameters, wherein the first set of parameters are not preconfigured for a specific application in which the motor is being installed. The method additionally includes receiving, by the motor controller, feedback associated with the first start attempt from the motor, and transmitting, by the motor controller, in response to the feedback, a second instruction to the motor to perform a second start attempt utilizing at least one parameter in a second set of parameters, wherein the second set of parameters differ from the first set of parameters.

In another aspect, a computer-readable storage device having computer-executable instructions embodied thereon is provided. When executed by a motor controller, the computer-executable instructions cause the motor controller to transmit a first instruction to a motor to perform a first start attempt utilizing at least one parameter in a first set of parameters, wherein the first set of parameters are not preconfigured for a specific application in which the motor is being installed; receive feedback associated with the first start attempt from the motor; and transmit, in response to the feedback, a second instruction to the motor to perform a second start attempt utilizing at least one parameter in a second set of parameters, wherein the second set of parameters differ from the first set of parameters.

DETAILED DESCRIPTION

Figure 1:
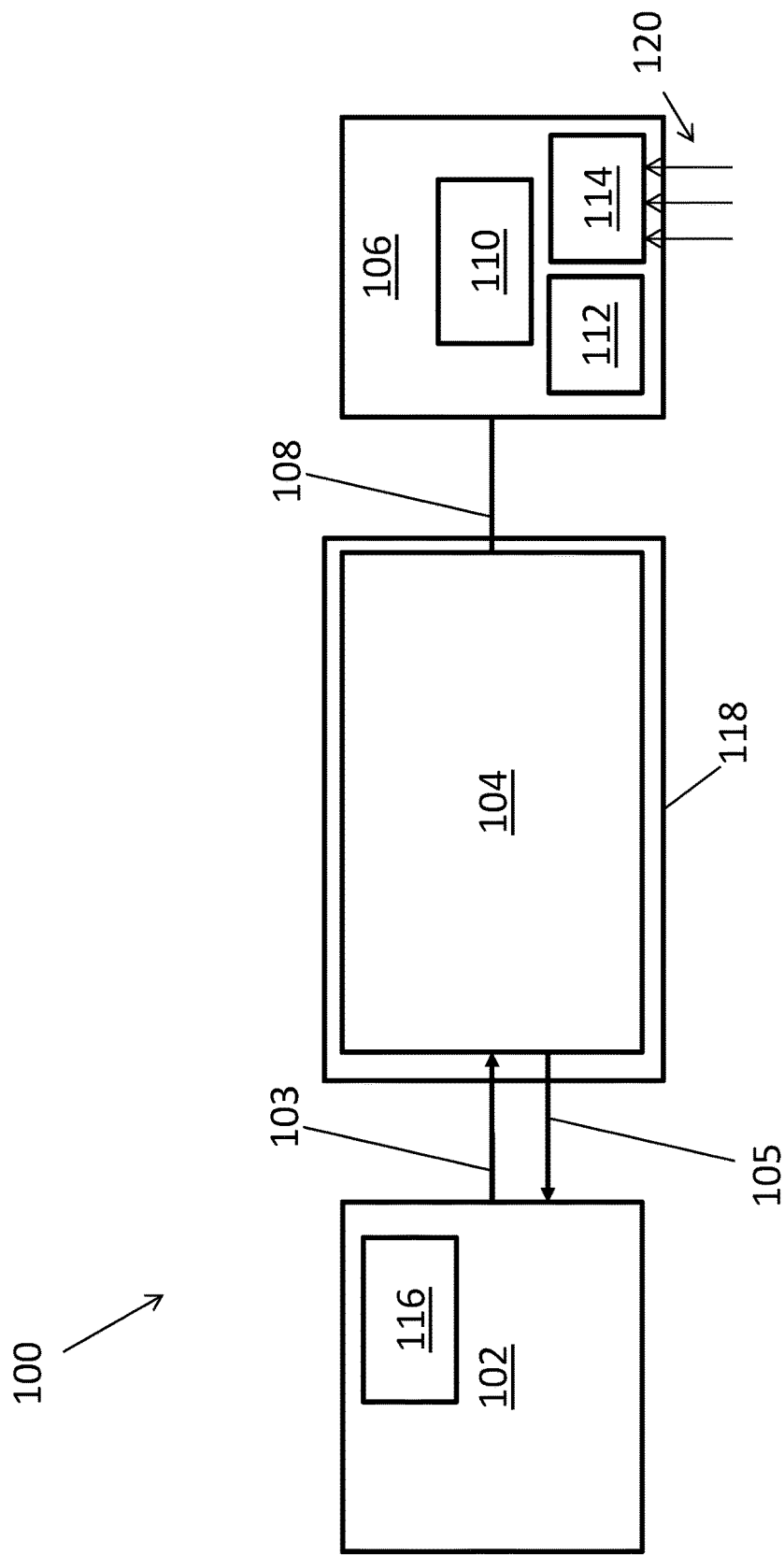
FIG. 1 is a block diagram of an example system that includes a motor controller coupled to a motor.

Implementations of the systems and methods described herein enable a motor controller to start a motor, for example an electronically commutated motor, based on a set of parameters that are not preconfigured for the specific environment or application of the motor before the motor is installed. More specifically, implementations of the systems and methods enable the motor controller to determine the set of parameters that cause the motor to exert the correct amount of effort to start the motor within the particular environment and application that the motor is used in. The parameters specify one or more of a starting voltage, a starting current, a start attempt duration, a start commutation timing, a braking duration, an alignment voltage, an alignment current, and an alignment duration. The motor controller transmits a first instruction to the motor to attempt to start the motor based on a first set of parameters. The motor controller then receives feedback from the motor based on the first start attempt. For example, the feedback may indicate that the motor controller failed to start.

Next, the motor controller transmits a second instruction to the motor to attempt to start the motor based on a second set of parameters. The second set of parameters cause the motor to exert more effort than in the first attempt. The motor controller may iteratively cycle through multiple attempts to start the motor, with each attempt being based on parameters that cause the motor to exert more effort than the previous attempt. Once the motor starts, the motor controller stores an indication in memory indicating the set of parameters that enabled the motor to successfully start. In subsequent start attempts, the motor controller transmits an instruction to start the motor based on the parameters associated with the stored indication. Accordingly, the motor controller adapts the starting parameters to the specific environment and application that the motor is used in, rather than requiring the parameters to be manually configured.

In one implementation, a computer program is provided, and the program is embodied on a computer-readable medium. In an example implementation, the computer program is executed on a single computing device, without requiring a connection to a server computer. The computer program is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

FIG. 1 is a block diagram of an example system 100 that includes a motor controller 102 coupled to a motor 104. Motor controller 102 transmits instructions 103 to motor 104 to control an operation of motor 104, and receives feedback 105 from motor 104 to determine the operational status of motor 104. In some implementations, motor controller 102 is incorporated within motor 104. Motor 104 may be an electric motor and, in some implementations, is an electric variable speed motor, such as an electronically commutated motor (ECM). In some implementations, motor 104 is a sensorless ECM, meaning motor 104 does not include sensors such as an encoder, optical sensors, or Hall sensors for determining a position or operational status of a rotor (not shown) in motor 104. Rather, in such implementations, motor 104 generates back electromotive force (BEMF) signals that may be received by motor controller 102, for example as part of feedback 105, to determine the operational status of motor 104. Motor 104 drives a load 106 that includes a fluid-moving element 110, such as a fan, a blower wheel, or an impeller. Motor 104 is coupled to fluid-moving element 110 by a shaft 108. Motor 104 rotates shaft 108, causing fluid-moving element 110 to receive a fluid such as air or water through an inlet 112 and force the fluid out through outlet 114. Accordingly, system 100 may be used, for example, in a heating, ventilation, and air conditioning (HVAC) system, or, in other implementations, in an aquatic system, such as a pool or spa. Multiple factors, such as a mounting 118 of motor 104, wind 120 directed into outlet 114, and/or an inertia of fluid-moving element 110 may affect an amount of effort that must be exerted by motor 104 in order to start. Motor controller 102 includes a computing device 116 configured to enable motor controller 102 to perform one or more functions described herein. In particular, motor controller 102 is configured to transmit instructions 103 to motor 104 to attempt to start motor 104 based on parameters stored in a memory 210 (FIG. 2) of computing device 116. As described in more detail herein, computing device 116 is configured to determine, based on feedback 105 from motor 104, parameters that cause motor 104 to exert a sufficient amount of effort to enable motor 104 to start.

Figure 2:
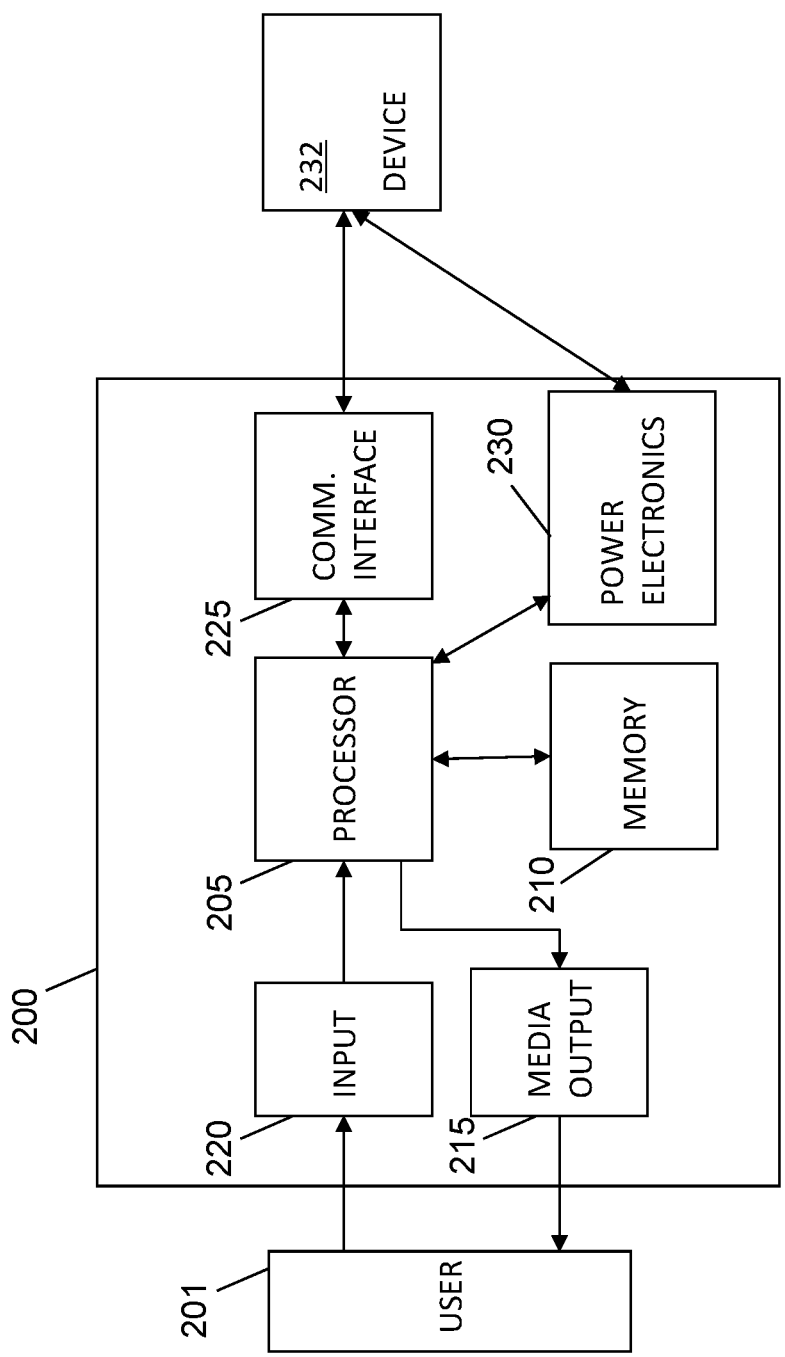
FIG. 2 is a block diagram of an example computing device.

FIG. 2 is a block diagram of an example computing device 200. At least some components of computing device 200 are included in implementations of other devices describe herein, for example computing device 116. Computing device 200 includes a processor 205 for executing instructions. In some implementations, executable instructions are stored in a memory area 210. Processor 205 may include one or more processing units (e.g., in a multi-core configuration). Memory area 210 is any device allowing information such as executable instructions and/or other data to be stored and retrieved. In computing device 116, memory area 210 stores parameters for starting motor 104, as described in more detail herein. Memory area 210 may include one or more computer-readable media.

In some implementations, computing device 200 also includes at least one media output component 215 for presenting information to user 201. Media output component 215 is any component capable of conveying information to user 201. In some implementations, media output component 215 includes an output adapter such as a video adapter and/or an audio adapter. An output adapter is operatively coupled to processor 205 and operatively couplable to an output device such as a display device (e.g., a liquid crystal display (LCD), one or more light emitting diodes (LED), an organic light emitting diode (OLED) display, cathode ray tube (CRT), or "electronic ink" display) or an audio output device (e.g., a speaker or headphones). In other implementations, computing device 200 does not include media output component 215. For example, some implementations of computing device 116 (FIG. 1) may not include media output component 215.

In some implementations, computing device 200 includes an input device 220 for receiving input from user 201. Input device 220 may include, for example, one or more buttons, a keypad, a touch sensitive panel (e.g., a touch pad or a touch screen), and/or a microphone. A single component such as a touch screen may function as both an output device of media output component 215 and input device 220. Some implementations of computing device 200, for example some implementations of computing device 116 (FIG. 1), do not include input device 220.

Computing device 200 may also include a communication interface 225, which is communicatively couplable to another device 232, for example motor 104. In some implementations, communication interface 225 is configured to enable communication through a short range wireless communication protocol such as Bluetooth™ or Z-Wave™, through a wireless local area network (WLAN) implemented pursuant to an IEEE (Institute of Electrical and Electronics Engineers) 802.11 standard (i.e., WiFi), and/or through a mobile phone (i.e., cellular) network (e.g., Global System for Mobile communications (GSM), 3G, 4G) or other mobile data network (e.g., Worldwide Interoperability for Microwave Access (WIMAX)), or a wired connection (i.e., one or more conductors for transmitting electrical signals). In implementations in which communication interface 225 couples motor controller 102 to motor 104, communication interface 225 may include, for example, one or more conductors for transmitting electrical signals and/or power to and/or from motor 104. Additionally, computing device 200 may also include power electronics 230 which may be coupled, for example, to processor 205 and motor 104.

Figure 3:
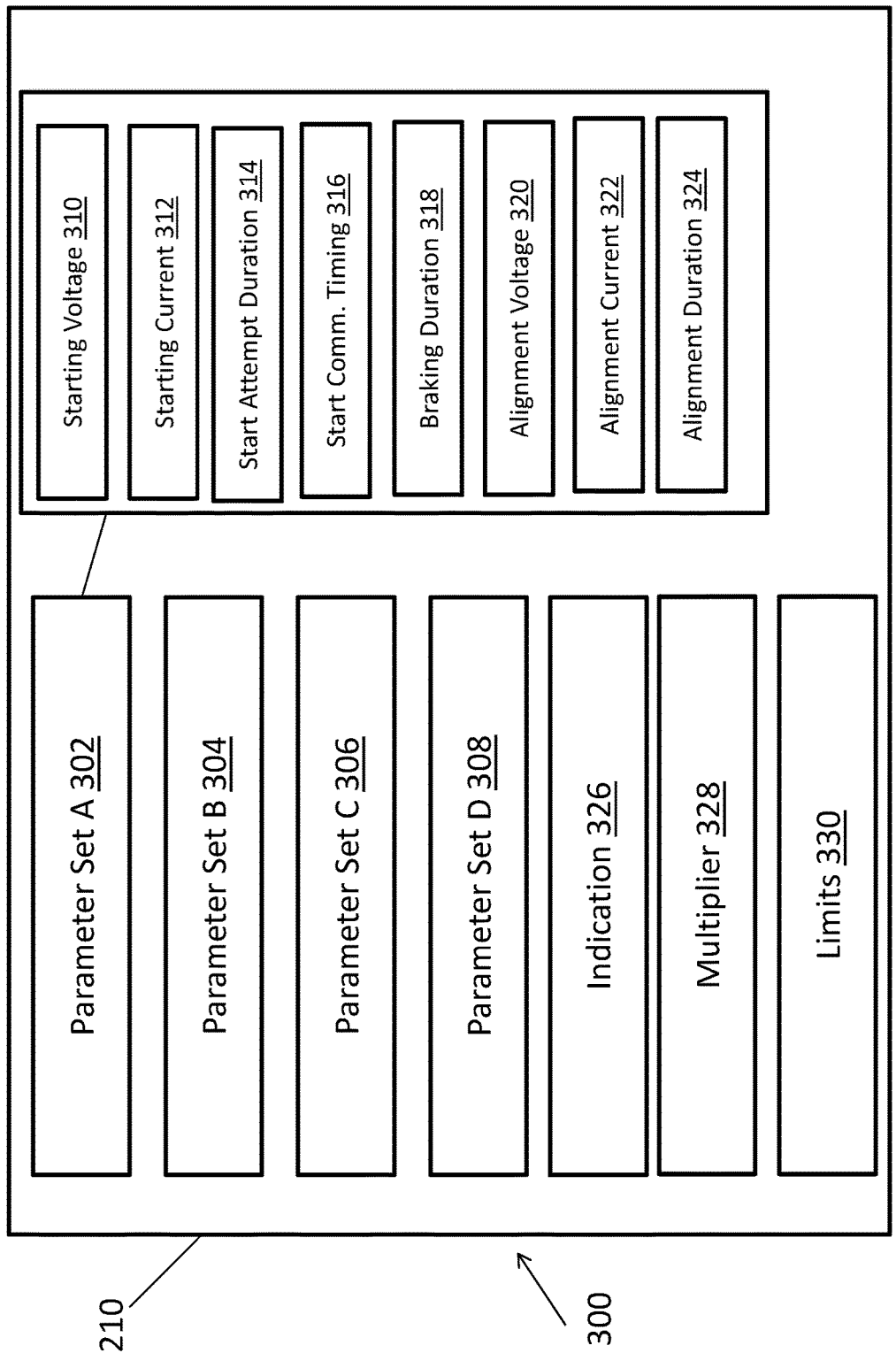
FIG. 3 is a block diagram of data stored in a memory of a computing device of the motor controller.

FIG. 3 is a block diagram of data 300 stored in memory 210 of computing device 116 included in motor controller 102. Data 300 includes a first parameter set 302, a second parameter set 304, a third parameter set 306, and a fourth parameter set 308. In other implementations, data 300 includes a different number of parameter sets than four. Each parameter set 302, 304, 306, and 308 includes one or more parameters pertaining to a start attempt by motor 104. More specifically, at least some of the parameters pertain to an amount of effort exerted by motor 104 to overcome factors that may resist the starting of motor 104, such as inertia of fluid-moving element 110, mounting 118 of motor 104, and/or wind 120 directed into outlet 114. First parameter set 302 includes, a starting voltage 310, a starting current 312, a start attempt duration 314, a start commutation timing 316, a braking duration 318, an alignment voltage 320, an alignment current 322, and an alignment duration 324. Each of second parameter set 304, third parameter set 306, and fourth parameter set 308 includes corresponding parameters associated with increasing levels of effort. The parameters associated with the parameter sets are examples only and in other implementations, the parameter sets may include different, more, or fewer parameters.

As an example, starting voltage 310 may be 110 Volts in first parameter set 302, and increase by 50 Volts in each of second parameter set 304, third parameter set 306, and fourth parameter set 308. More specifically, for example, in a first start attempt, motor 104 applies 110 Volts for commutation during start attempt duration 314. In a second start attempt, motor 104 may apply, for example, 160 Volts for commutation during a second start attempt duration, and so on. Start commutation timing 316 represents a time period in which motor 104 energizes each winding (not shown) in motor 104. Given that wind 120 entering through outlet 114 may cause fluid-moving element 110 to rotate in a reverse direction prior to starting motor 104, a portion of the start process may include slowing or stopping the reverse rotation and aligning a rotor (not shown) within motor 104. Accordingly, braking duration 318 represents a time period in which motor 104 short circuits (e.g., connects) two or more of the windings (not shown) to slow or stop the reverse rotation of fluid-moving element 110. Alignment duration 324 represents a time period in which motor 104 energizes the windings (not shown) to align the rotor (not shown) based on alignment voltage 320 and/or alignment current 322. One or more of starting current 312, start attempt duration 314, start commutation timing 316, braking duration 318, alignment voltage 320, alignment current 322, and alignment duration 324 additionally or alternatively change in each of second parameter set 304, third parameter set 306, and fourth parameter set 308.

Additionally, memory 210 includes an indication 326 of which parameters result in a successful start of motor 104. For example, indication 326 may indicate second parameter set 304. In some implementations, memory 210 includes a multiplier 328 and computing device 116 generates a parameter set, for example second parameter set 304, by multiplying one or more of parameters 310, 312, 314, 316, 318, 320, 322, and 324 by multiplier 328. In some implementations, memory 210 includes one or more limits 330 representing values for one or more of parameters 310, 312, 314, 316, 318, 320, 322, 324, that should not be exceeded based on one or more capabilities of motor 104. In some implementations, computing device 116 transmits an instruction 103 to motor 104 to align a rotor (not shown) within motor 104, based on one or more of alignment voltage 320, alignment current 322, and alignment duration 324.

Figure 4:
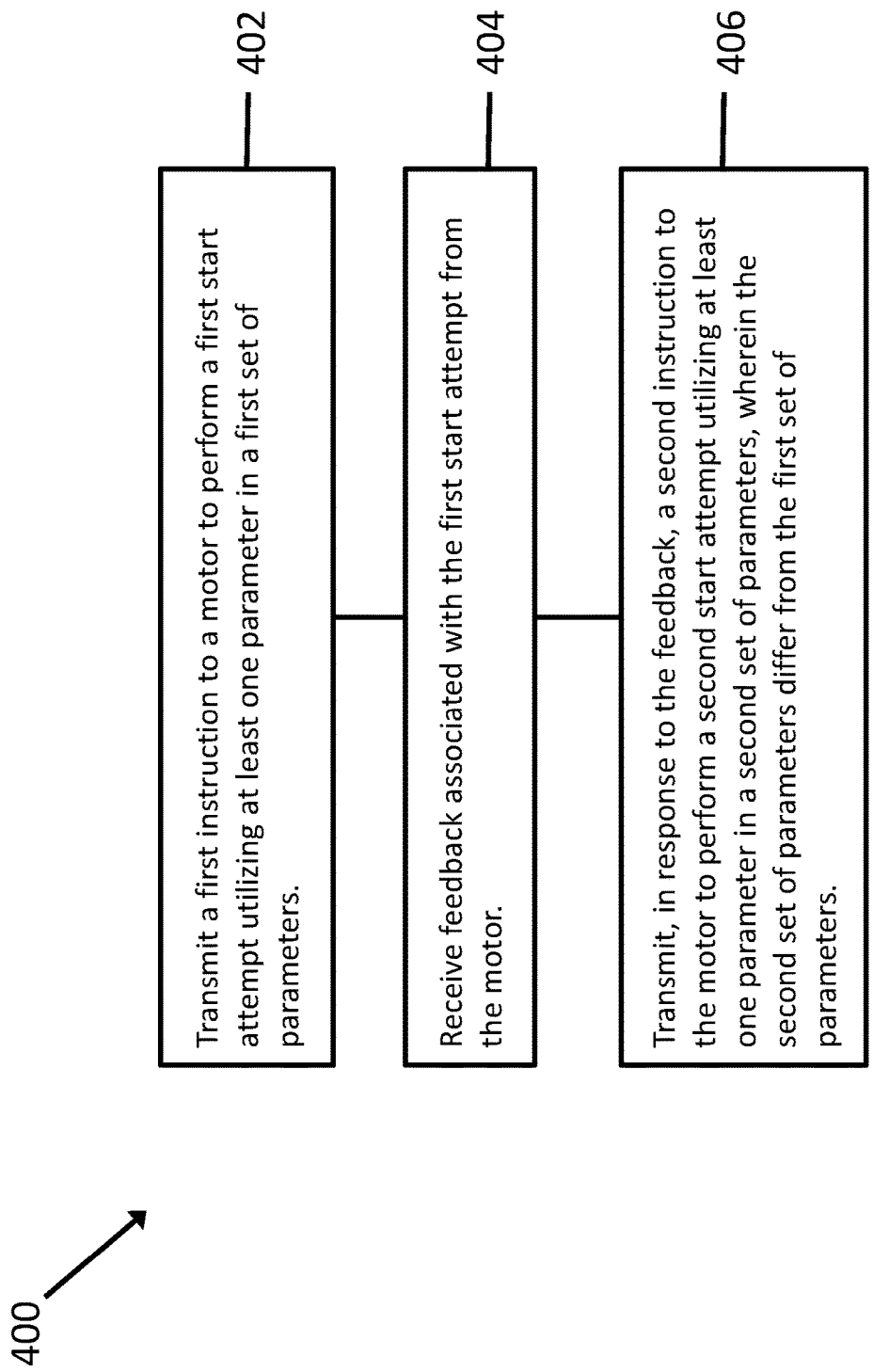
FIG. 4 is a flow chart of an example process performed by the motor controller in accordance with one aspect of the present disclosure.

FIG. 4 is a flow chart of an example process 400 performed by motor controller 102 in accordance with one aspect of the present disclosure. Initially, motor controller 102 transmits 402 a first instruction 103 to motor 104 to perform a first start attempt utilizing at least one parameter (e.g., starting voltage 310) in a first set of parameters (e.g., first parameter set 302). Next, motor controller 102 receives 404 feedback 105 associated with the first start attempt from motor 104. For example, feedback 105 may indicate that motor 104 failed to start, based for example, on a particular pattern of BEMF or lack thereof, in feedback 105. Additionally, motor controller 102 transmits 406, in response to feedback 105, a second instruction 103 to motor 104 to perform a second start attempt utilizing at least one parameter (e.g., starting voltage 310) in a second set of parameters (e.g., second parameter set 304). The second set of parameters (e.g., second parameter set 304) differ from the first set of parameters (e.g., first parameter set 302).

In some implementations, the feedback is first feedback, motor controller 102 additionally includes a memory (e.g., memory 210), and motor controller 102 is further configured to receive second feedback 105 associated with the second start attempt from motor 104, determine, from second feedback 105, that the second set of parameters (e.g., second parameter set 304) caused motor 104 to start successfully, and store an indication (e.g., indication 326) in memory 210 to use the second set of parameters (e.g., second parameter set 304) for subsequent attempts to start motor 104.

In some implementations, motor controller 102 includes a memory (e.g., memory 210) that includes at least the first set of parameters (e.g., first parameter set 302) and the second set of parameters (e.g., second parameter set 304), and motor controller 102 is further configured to select the second set of parameters (e.g., second parameter set 304) from memory 210 in response to feedback 105.

In some implementations, motor controller 102 is configured to generate the second set of parameters (e.g., second parameter set 304) by adjusting the first set of parameters (e.g., first parameter set 302) in response to feedback 105. In some such implementations, motor controller 102 is further configured to adjust the first set of parameters (e.g., first parameter set 302) by applying a multiplier (e.g., multiplier 328) to the at least one parameter (e.g., starting voltage 310) in the first set of parameters (e.g., first parameter set 302).

In some implementations, motor controller 102 is further configured to transmit the first instruction 103 such that the at least one parameter is at least one of a starting voltage (e.g., starting voltage 310), a starting current (e.g., starting current 312), a start attempt duration (e.g., start attempt duration 314), a start commutation timing (e.g., start commutation timing 316), a braking duration (e.g., braking duration 318), an alignment voltage (e.g., alignment voltage 320), an alignment current (e.g., alignment current 322), and an alignment duration (e.g., alignment duration 324). In some implementations, motor controller 102 is further configured to transmit an alignment instruction 103 to motor 104, for example before or as part of the first instruction.

In some implementations, the first set of parameters (e.g., first parameter set 302) is associated with a first amount of effort and the second set of parameters (e.g., second parameter set 304) is associated with a second amount of effort that is greater than the first amount of effort. In some implementations, motor controller 102 is configured to detect whether motor 104 failed to start based on feedback 105.

The methods and systems described herein may be implemented using computer programming or engineering techniques including computer software, firmware, hardware or any combination or subset thereof, wherein the technical effect may include at least one of: (a) transmitting a first instruction to a motor to perform a first start attempt utilizing at least one parameter in a first set of parameters; (b) receiving feedback associated with the first start attempt from the motor; and (c) transmitting, in response to the feedback, a second instruction to the motor to perform a second start attempt utilizing at least one parameter in a second set of parameters, wherein the second set of parameters differ from the first set of parameters.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

As compared to known systems and methods for starting a motor, the systems and methods described herein enable a motor controller to adaptively determine a set of parameters that enable the motor to start in a given environment. Accordingly, the added time and cost associated with manually tuning parameters for starting a motor in the environment may be eliminated.

Exemplary embodiments of systems and methods for starting a motor are described herein. The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motor controller coupled to a motor, the motor controller configured to:
   transmit a first instruction to the motor to perform a first start attempt utilizing at least one parameter in a first set of parameters, wherein the first set of parameters are not preconfigured for a specific application in which the motor is being installed;
   receive first feedback associated with the first start attempt from the motor; and
   transmit, in response to the first feedback, a second instruction to the motor to perform a second start attempt utilizing at least one parameter in a second set of parameters, wherein the second set of parameters differ from the first set of parameters.

2. The motor controller of claim 1, wherein the feedback is first feedback, the motor controller comprises a memory, and the motor controller is further configured to:
   receive second feedback associated with the second start attempt from the motor;
   determine, from the second feedback, whether the second set of parameters caused the motor to start successfully; and
   when the motor controller determines a successful start of the motor, store an indication in said memory that the second set of parameters caused the motor to start successfully.

3. The motor controller of claim 2, wherein for a subsequent first start attempt of the motor, the motor controller is configured transmit a subsequent first instruction to the motor to perform the subsequent first start attempt utilizing the second set of parameters.

4. The motor controller of claim 2, wherein for a subsequent first start attempt of the motor, the motor controller is configured to:
   determine a set of parameters from a plurality of sets of parameters stored in said memory to utilize based on the stored indication; and transmit a subsequent first instruction to the motor to perform the subsequent first start attempt utilizing the determined set of parameters from the plurality of sets of parameters.

5. The motor controller of claim 2, wherein when the motor controller determines that the second set of parameters failed to successfully start the motor, the motor controller is configured to transmit additional instructions to the motor to perform subsequent start attempts utilizing varying sets of parameters until one of said motor controller receives feedback from the motor indicating a successful start, a predefined limit of a value of the varying sets of parameters is reached, or a predefined limit of start attempts is reached.

6. The motor controller of claim 1, wherein the motor controller comprises a memory that includes at least the first set of parameters and the second set of parameters, and said motor controller is further configured to select the second set of parameters from said memory in response to the feedback.

7. The motor controller of claim 1, wherein the motor controller is configured to generate the second set of parameters by adjusting the first set of parameters in response to the feedback.

8. The motor controller of claim 7, wherein to adjust the first set of parameters, the motor controller is configured to one of increase or decrease the at least one parameter in the first set of parameters.

9. The motor controller of claim 7, wherein to adjust the first set of parameters, the motor controller is configured to apply a multiplier to the at least one parameter in the first set of parameters.

10. The motor controller of claim 1, wherein the at least one parameter includes at least one of a starting voltage, a starting current, a start attempt duration, a start commutation timing, a braking duration, an alignment voltage, an alignment current, and an alignment duration.

11. The motor controller of claim 1, further configured to transmit an alignment instruction to the motor before or concurrently with the first instruction.

12. The motor controller of claim 1, wherein the first set of parameters is associated with a first amount of effort and the second set of parameters is associated with a second amount of effort that is greater than the first amount of effort.

13. A method of starting a motor, comprising:
   transmitting, by a motor controller, a first instruction to the motor to perform a first start attempt utilizing at least one parameter in a first set of parameters, wherein the first set of parameters are not preconfigured for a specific application in which the motor is being installed;
   receiving, by the motor controller, feedback associated with the first start attempt from the motor; and
   transmitting, by the motor controller, in response to the feedback, a second instruction to the motor to perform a second start attempt utilizing at least one parameter in a second set of parameters, wherein the second set of parameters differ from the first set of parameters.

14. The method of claim 13, wherein the feedback is first feedback and the motor controller includes a memory, said method further comprising:
   receiving second feedback associated with the second start attempt from the motor;
   determining, from the second feedback, whether the second set of parameters caused the motor to start successfully; and
   when the motor controller determines a successful start of the motor, storing an indication in the memory that the second set of parameters caused the motor to start successfully.

15. The method of claim 14, wherein for a subsequent first start attempt of the motor, said method comprises transmitting a subsequent first instruction to the motor to perform the subsequent first start attempt utilizing the second set of parameters.

16. The method of claim 14, wherein for a subsequent first start attempt of the motor, said method comprises:
   determining a set of parameters from a plurality of sets of parameters stored in the memory to utilize based on the stored indication; and
   transmitting a subsequent first instruction to the motor to perform the subsequent first start attempt utilizing the determined set of parameters from the plurality of sets of parameters.

17. The method of claim 13, further comprising selecting the second set of parameters from a plurality of sets of parameters in response to the feedback, the plurality of sets of parameters stored in a memory of the motor controller.

18. The method of claim 13, further comprising generating the second set of parameters by adjusting the first set of parameters in response to the feedback.

19. The method of claim 13, further comprising transmitting an alignment instruction to the motor before or concurrently with the first instruction.

20. A computer-readable storage device having computer-executable instructions embodied thereon, wherein when executed by a motor controller, cause the motor controller to:
   transmit a first instruction to the motor to perform a first start attempt utilizing at least one parameter in a first set of parameters, wherein the first set of parameters are not preconfigured for a specific application in which the motor is being installed;
   receive first feedback associated with the first start attempt from the motor; and
   transmit, in response to the first feedback, a second instruction to the motor to perform a second start attempt utilizing at least one parameter in a second set of parameters, wherein the second set of parameters differ from the first set of parameters.

* * * * *